US008593337B2

(12) United States Patent
Ookawa

(10) Patent No.: US 8,593,337 B2
(45) Date of Patent: Nov. 26, 2013

(54) PHASED ARRAY ANTENNA AND ITS PHASE CALIBRATION METHOD

(75) Inventor: Kunihiko Ookawa, Kariya (JP)

(73) Assignee: Denso Corporation, Kariya (JP)

( * ) Notice: Subject to any disclaimer, the term of this patent is extended or adjusted under 35 U.S.C. 154(b) by 82 days.

(21) Appl. No.: 13/314,343

(22) Filed: Dec. 8, 2011

(65) Prior Publication Data

US 2012/0146841 A1 Jun. 14, 2012

(30) Foreign Application Priority Data

Dec. 9, 2010 (JP) ................................ 2010-274512

(51) Int. Cl.
*G01S 7/40* (2006.01)

(52) U.S. Cl.
USPC ............................ 342/174; 342/165; 342/173

(58) Field of Classification Search
USPC .................................. 342/147, 157, 159–175
See application file for complete search history.

(56) References Cited

U.S. PATENT DOCUMENTS

| | | | | |
|---|---|---|---|---|
| 4,163,974 | A * | 8/1979 | Profera | 342/154 |
| 4,338,605 | A * | 7/1982 | Mims | 342/373 |
| 4,580,141 | A * | 4/1986 | Gutleber | 343/844 |
| 4,596,986 | A * | 6/1986 | Andrews et al. | 342/373 |
| H173 | H * | 12/1986 | Claborn et al. | 342/372 |
| 4,642,645 | A * | 2/1987 | Haupt | 342/379 |
| 4,876,548 | A * | 10/1989 | Lopez | 342/368 |
| 4,994,813 | A * | 2/1991 | Shiramatsu et al. | 342/360 |
| 5,072,228 | A * | 12/1991 | Kuwahara | 342/360 |
| 5,187,486 | A * | 2/1993 | Kolzer | 342/360 |
| 5,345,246 | A * | 9/1994 | Sezai | 342/368 |
| 5,412,414 | A * | 5/1995 | Ast et al. | 342/174 |
| 5,434,576 | A * | 7/1995 | Haupt | 342/378 |
| 5,512,900 | A * | 4/1996 | Parkin et al. | 342/35 |
| 5,657,023 | A * | 8/1997 | Lewis et al. | 342/174 |
| 5,867,123 | A * | 2/1999 | Geyh et al. | 342/372 |
| 5,929,810 | A * | 7/1999 | Koutsoudis et al. | 342/373 |
| 6,208,287 | B1 * | 3/2001 | Sikina et al. | 342/174 |
| 6,336,033 | B1 * | 1/2002 | Yamaguchi et al. | 455/273 |
| 6,339,399 | B1 * | 1/2002 | Andersson et al. | 342/372 |
| 6,507,315 | B2 * | 1/2003 | Purdy et al. | 342/374 |
| 6,747,595 | B2 * | 6/2004 | Hirabe | 342/174 |

(Continued)

FOREIGN PATENT DOCUMENTS

| | | |
|---|---|---|
| JP | 60-198903 | 10/1985 |
| JP | 2-183172 | 7/1990 |

(Continued)

*Primary Examiner* — Jack W Keith
*Assistant Examiner* — Peter Bythrow
(74) *Attorney, Agent, or Firm* — Harness, Dickey & Pierce, PLC

(57) ABSTRACT

A phased array antenna includes an oscillator, a plurality of antenna elements, a phase shifter, a distributor, a receiver, and a control processor. The control processor performs a first calibration process to calibrate a phase of the phase shifter connected to a pair of antenna elements that is selected from the antenna elements and are located at a pair of positions symmetric with respect to a central axis of an array formed by the phased array antenna, and a second calibration process to calibrate a phase of the phase shifter connected to a pair of target antenna elements with respect to a phase of the phase shifter connected to a reference antenna elements located at a central portion of the array. The pair of target antenna elements are located at a pair of positions that are symmetric with respect to the central axis of the array.

2 Claims, 9 Drawing Sheets

(56) References Cited

U.S. PATENT DOCUMENTS

| | | | | |
|---|---|---|---|---|
| 6,771,216 | B2 * | 8/2004 | Patel et al. | 342/368 |
| 7,098,847 | B2 * | 8/2006 | Li | 342/368 |
| 7,106,249 | B2 * | 9/2006 | Kubo et al. | 342/174 |
| 7,248,209 | B2 * | 7/2007 | Shima et al. | 342/173 |
| 7,340,248 | B2 * | 3/2008 | Kawasaki et al. | 455/423 |
| 7,362,266 | B2 * | 4/2008 | Collinson | 342/372 |
| 7,545,321 | B2 * | 6/2009 | Kawasaki | 342/368 |
| 8,049,662 | B2 * | 11/2011 | Stayton | 342/174 |
| 8,134,495 | B2 * | 3/2012 | Ookawa et al. | 342/202 |
| 8,154,452 | B2 * | 4/2012 | Webb | 342/368 |
| 8,199,048 | B1 * | 6/2012 | Medina Sanchez | 342/174 |
| 8,299,964 | B2 * | 10/2012 | Janaswamy et al. | 342/372 |
| 8,427,362 | B2 * | 4/2013 | Ookawa | 342/81 |
| 2003/0038746 | A1 * | 2/2003 | Patel et al. | 342/368 |
| 2003/0038747 | A1 * | 2/2003 | Patel et al. | 342/368 |
| 2003/0142012 | A1 * | 7/2003 | Hirabe | 342/173 |
| 2007/0069945 | A1 * | 3/2007 | Weese | 342/174 |
| 2009/0027258 | A1 * | 1/2009 | Stayton | 342/174 |
| 2010/0117890 | A1 * | 5/2010 | Vook et al. | 342/174 |
| 2012/0154206 | A1 * | 6/2012 | Medina Sanchez | 342/174 |

FOREIGN PATENT DOCUMENTS

| | | |
|---|---|---|
| JP | 3-165103 | 7/1991 |
| JP | 03-174805 | 7/1991 |
| JP | 2002-176309 | 6/2002 |
| JP | 2005-252396 | 9/2005 |
| JP | 2009-218677 | 9/2009 |
| WO | WO 98/56068 | 12/1998 |
| WO | WO 2004/013644 | 2/2004 |

* cited by examiner

DIRECTIVITY PATTERN DUE TO THREE ANTENNA ELEMENTS

DIRECTIVITY PATTERN DUE TO TWO ANTENNA ELEMENTS (NUMBER OF ARRAYED ANTENNA ELEMENTS IS ODD)

(NUMBER OF ARRAYED ANTENNA ELEMENTS IS EVEN)

PHASED ARRAY ANTENNA AND ITS PHASE CALIBRATION METHOD

CROSS-REFERENCE TO RELATED APPLICATION

This application is based on and claims the benefit of priority from earlier Japanese Patent Application No. 2010-274512 filed Dec. 9, 2010, the description of which is incorporated herein by reference.

BACKGROUND OF THE INVENTION

1. Technical Field of the Invention

The present invention relates to a phased array antenna including a plurality of antenna elements and its phase calibration method for calibrating a phase of the plurality of antenna elements.

2. Related Art

A phased array antenna including a plurality of antenna elements is needed to calibrate a phase of each antenna element in such a manner that radio waves outputted by the antenna elements have the same phase under a predetermined set of conditions.

In the related art, a technique is known to, upon a calibration of a phase of the plurality of antenna elements, (i) change a phase of only one arbitrary antenna element under condition that radio waves with a predetermined power is radiated, (ii) monitor a resultant change in a radiated power of all of the plurality of antenna elements at a receiver located at a front plane side of a radio wave radiation plane to obtain a phase value of the one arbitrary antenna element, (iii) perform the above steps (i) and (ii) for all antenna elements to obtain phase values of all antenna elements, and (iv) calibrate a phase of each antenna elements based on these phase values (see WO2004/013644 A1).

As the other related art, a phase array antenna, which includes a plurality of antenna elements, is known to, in order to maintain low side lobes, dispose an attenuator for an antenna element located at the end portion of an array of the plurality of antenna elements, and to lower an output of radio waves from the antenna element located at the end portion, compared to an antenna element located at the center portion of the array.

However, it is difficult to accurately calibrate the phased array antenna configured to reduce side lobes of the phased array antenna by gradually lowering the output of the radio waves outputted by the phased array antenna from the center portion to the end portion. This is due to the following two reasons.

(1) In the case where the antenna element located at the end portion of the array is calibrated under condition that the radio waves with a predetermined power is radiated by the plurality of antenna elements, when only its phased is changed, a change in the radiated power capable of being detected by the receiver is low because the change is more affected by the other antenna elements and then, a phase of a target antenna element cannot be precisely measured.

(2) The above problem (1) may be solved by obtaining a null point from a directivity pattern of a output difference between two antenna elements of the plurality of antenna elements, and subsequently adjusting phases of the two antenna elements in such a manner that a position of the null point obtained is put at a midpoint between the two antenna elements to calibrate the phases. However, in this case, when the power of the radio waves outputted by the plurality of antenna elements is different every antenna element, as shown in FIG. 6, a depth of the null point (null depth) in the directivity pattern formed by two antenna elements becomes is shallow. Therefore, the null point cannot be precisely detected.

SUMMARY OF THE INVENTION

The present invention has been made in light of the conditions set forth above and has as its exemplary object to provide a phased array antenna and its phase calibration method capable of easily and accurately calibrating a phase of antenna elements of a phased array antenna for reducing side lobes by differentiating a power output of an antenna element located at the center portion of the array from that of an antenna element located at the end portion of the array.

According to an first exemplary aspect of the present invention, there is provided a phased array antenna, comprising: an oscillator that generates radio waves; a plurality of antenna elements that radiates radio waves: a phase shifter that is connected to each of the plurality of antenna elements and changes a phase of radio waves radiated by the plurality of antenna elements: a distributor that distributes radio waves generated by the oscillator to the plurality of antenna elements via the phase shifter; a receiving unit that receives radio waves radiated by the plurality of antenna elements: and a control processor that performs a first calibration process to calibrate a phase of the phase shifter connected to a pair of antenna elements that are selected from the plurality of antenna elements and are located at a pair of positions symmetric with respect to a central axis of an array formed by the phased array antenna, and a second calibration process to calibrate a phase of the phase shifter connected to a pair of target antenna elements with respect to a phase of the phase shifter connected to a reference antenna elements located at a central portion of the array, the pair of target antenna elements being located at a pair of positions that are symmetric with respect to the central axis of the array.

The control processor may perform the second calibration process to: a) select, from the plurality of antenna elements, a reference antenna element located at a position on the central axis of the array and a pair of target antenna elements that are selected from the plurality of antenna elements and are located at positions symmetric with respect to the central axis of the array to allow the radio waves generated by the oscillator to be provided for the reference antenna element and the pair of target antenna elements via the distributor; b) obtain a directivity pattern formed by the reference antenna element and the pair of target antenna elements from a distribution in a received power of the radio waves received at the receiving unit along a horizontal direction with respect to an array direction of the plurality of antenna elements, when a phase of the phase shifter connected to the reference antenna element is fixed and a phase of the phase shifter connected to the pair of target antenna elements is changed; c) extract, from the directivity pattern obtained, a phase of the phase shifter connected to the pair of target antenna elements at which a level of side lobes, which occur in the directivity pattern obtained, becomes a predetermined value; and d) set the phase obtained to a phase value for the phase of the phase shifter connected to the pair of target antenna elements with respect to the phase of the phase shifter connected to the reference antenna element.

The control processor may repeat the second calibration process while changing the pair of target antenna elements until the phase values for all of the pair of target antenna elements are set.

The number of arrayed antenna elements that form the array of the phased array antenna may be odd, and the reference antenna element may be an antenna element located at a position on the central of the array.

The number of arrayed antenna elements that form the array of the phased array antenna may be even, and the reference antenna element may be a pair of antenna elements located at a pair of positions that is the nearest to the central axis among a pair of positions symmetric with respect to the center axis of the array.

The control processor may perform the first calibration process to: select, from the plurality of antenna elements, the pair of antenna elements located at the pair of positions that are symmetric with respect to a central axis of an array formed by the phased array antenna to allow the radio waves generated by the oscillator to be provided for the pair of antenna elements, obtain a pattern of a change in a received power of the radio waves received at the receiving unit, when a phase of the phase shifter connected to one of the pair of antenna element is fixed and a phase of the phase shifter connected to the other of the pair of antenna elements is changed, detect, from the pattern obtained, a phase difference between phases of the phase shifter at a null point where a null occurs in the pattern, and calibrate the phase of the phase shifter based on the phase difference detected.

According to the above phased array antenna, even if a power radiated by each antenna element is different, the phase of radio waves radiated by each antenna element can be easily aligned, and a desired directivity pattern can be obtained. Hereinafter, the reason is described.

In the exemplary aspect, radio waves produced by the oscillator are provided for only a pair of antenna elements located at a pair of positions symmetric with respect to a central axis of an array of the plurality of antenna elements forming the phased array antenna.

Since the pair of antenna elements symmetric with respect to the central axis radiates radio waves with the same power, a deep null is formed depending on a phase difference between the pair of antenna elements.

For example, while a phase for one of the pair of antenna elements is fixed and a phase for the other of the pair of antenna elements is changed within the range 0° to 360°, a level of a received signal (received power) is measured and a null occurring in the received signal is detected. This makes it possible to precisely obtain a phase difference between the pair of antenna elements and to align the phase for one of the pair of antenna elements with the phase for the other of the pair of antenna elements. That is, a phase calibration between the pair of antenna elements can be performed.

The above phase calibration is performed for every the pair of antenna elements symmetric with respect to the central axis of the array, and then a phase for all of the pair of antenna elements is aligned for every pair of antenna elements.

Subsequently, radio waves produced by the oscillator are provided for only a reference antenna element and pair of target antenna elements that are symmetric with respect to 1 the central axis of the array and both phases are aligned with each other. The reference antenna element may be an antenna element located at a position on the central axis of the array in the case where the number of antenna elements is odd, or may be a pair of antenna elements symmetric with respect to the central axis of the array in the case where the number of antenna elements is even.

In this case, the following directivity pattern is obtained. The directivity pattern is formed by the reference antenna element and the pair of target antenna elements, and is symmetric with respect to the central axis in a horizontal direction to an array direction of the plurality of antenna elements.

When a phase of the phase shifter connected to the pair of antenna elements is changed in the same manner, the magnitude of the side lobes in the directivity pattern is changed.

Therefore, if a phase value of the phase shifter is set in such a manner that a value of the side lobe becomes a predetermined value, even if a power radiated by each antenna element is different, a phase of radio waves radiated by each antenna element can be easily aligned, and a desired directivity pattern can be obtained.

Then, if the above process to set the phase of the phase shifter is performed for the reference antenna element and all of the pair of antenna elements symmetric with respect to the central axis of the array, side lobes in the directivity pattern can be accurately and easily reduced.

According to an second exemplary aspect of the present invention, there is provided a phase calibration method for a phased array antenna that comprises an oscillator that generates radio waves, a plurality of antenna elements that radiates radio waves, a phase shifter that is connected to each of the plurality of antenna elements and changes a phase of radio waves radiated by the plurality of antenna elements, a distributor that distributes radio waves generated by the oscillator to the plurality of antenna elements via the phase shifter, a receiving unit that receives radio waves radiated by the plurality of antenna elements, and a control processor that performs a calibration process for the phased array antenna, the phase calibration method comprising: at the control processor, performing a first calibration process to calibrate a phase of the phase shifter connected to a pair of antenna elements that is selected from the plurality of antenna elements and is located at a pair of positions symmetric with respect to a central axis of an array formed by the phased array antenna, and performing a second calibration process to calibrate a phase of the phase shifter connected to a pair of target antenna elements with respect to a phase of the phase shifter connected to a reference antenna elements located at a central portion of the array, the pair of target antenna elements being located at a pair of positions that are symmetric with respect to the central axis of the array.

The second calibration process may include: selecting, from the plurality of antenna elements, a reference antenna element located at a position of the central axis of the array and a pair of target antenna elements that is selected from the plurality of antenna elements and is located at positions symmetric with respect to the central axis of the array to allow the radio waves generated by the oscillator to be provided for the reference antenna element and the pair of target antenna elements via the distributor; obtaining a directivity pattern formed by the reference antenna element and the pair of target antenna elements from a distribution in a received power of radio waves received at the receiving unit along a horizontal direction with respect to an array direction of the plurality of antenna elements, when a phase of the phase shifter connected to the reference antenna element is fixed and a phase of the phase shifter connected to the pair of target antenna elements is changed; extracting, from the directivity pattern obtained, a phase of the phase shifter connected to the pair of target antenna elements at which a level of side lobes, which occur in the directivity pattern obtained, becomes a predetermined value; setting the phase obtained to a phase value for the phase of the phase shifter connected to the pair of target antenna elements with respect to the phase of the phase shifter connected to the reference antenna element.

The phase calibration method may further comprise: repeating, at the control processor, the second calibration process while changing the pair of target antenna elements until the phase values for all of the pair of target antenna elements are set.

The number of antenna elements that form the array of the phased array antenna may be odd, and the reference antenna element may be an antenna element located at a position on the central of the array.

The number of antenna elements that form the array of the phased array antenna may be even, and the reference antenna element may be a pair of antenna elements located at a pair of positions nearest to the central axis among a pair of positions symmetric with respect to the center axis of the array.

The control processor may perform the first calibration process to: a) select, from the plurality of antenna elements, the pair of antenna elements located at the pair of positions that are symmetric with respect to a central axis of an array fainted by the phased array antenna to allow the radio waves generated by the oscillator to be provided for the pair of antenna elements; b) obtain a pattern of a change in a received power of the radio waves received at the receiving unit, while a phase of the phase shifter connected to one of the pair of antenna element is fixed and a phase of the phase shifter connected to the other of the pair of antenna elements is changed; c) detect, from the pattern obtained, a phase difference between phases of the phase shifter at a null point where a null occurs in the pattern; and d) calibrate the phase of the phase shifter based on the phase difference detected.

According to the phase calibration method, side lobes in the directivity pattern can be accurately and easily reduced.

DETAILED DESCRIPTION OF THE PREFERRED EMBODIMENTS

With reference to the accompanying drawings, hereinafter is described a phased array antenna and its calibration method according to an exemplary embodiment of the present invention.

Figure 1:
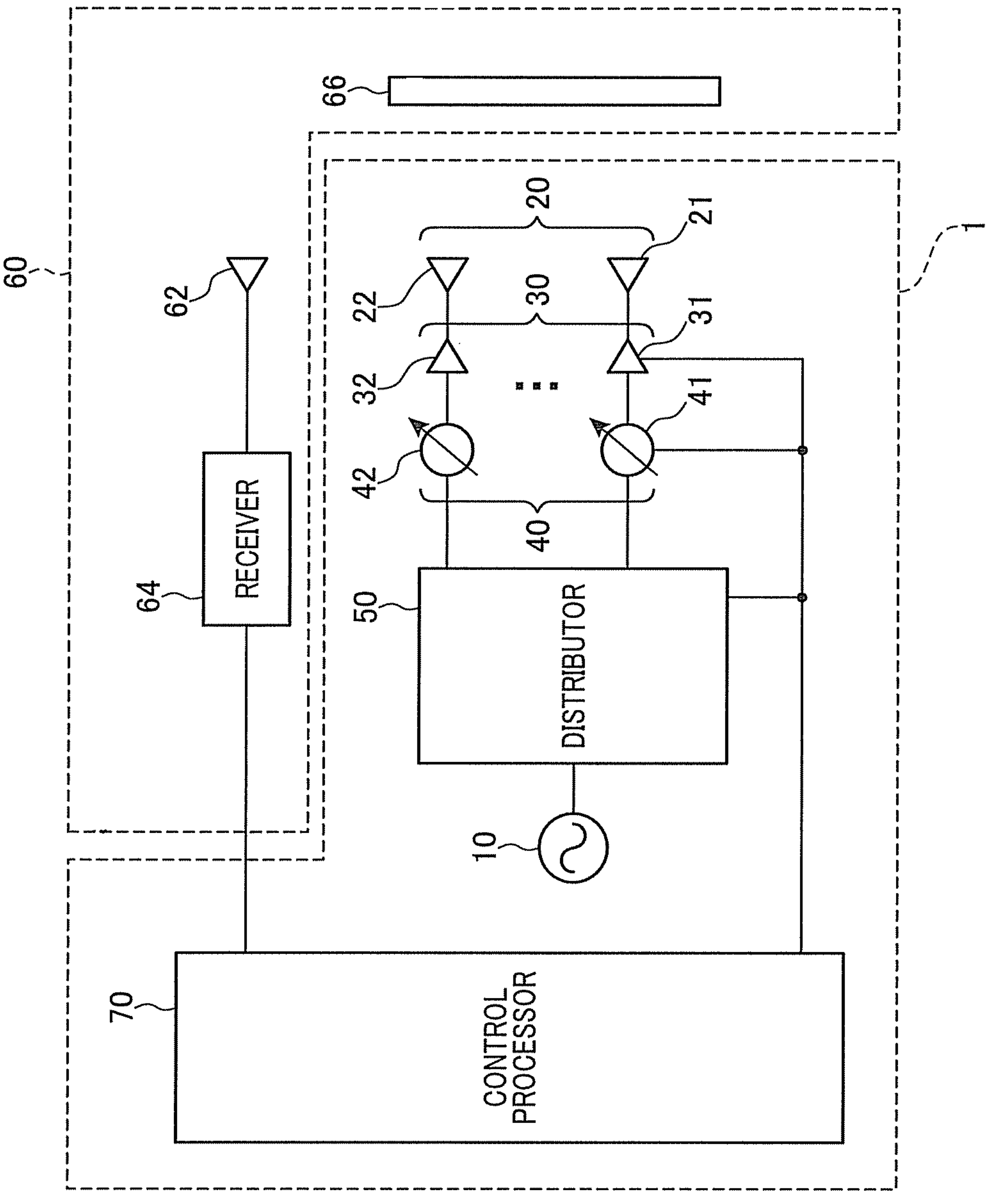
FIG. 1 is a schematic block diagram showing a configuration of a phased array antenna according to an exemplary embodiment of the present invention.

FIG. 1 is a schematic block diagram illustrating a configuration of a phased array antenna 1 according to the exemplary embodiment. The phased array antenna 1 can be applied to a radar apparatus such as an on-board radar mounted on a vehicle. A shown in FIG. 1, the phased array antenna includes an oscillator 10, a plurality of transmitting antenna elements 20 (hereinafter referred to as "antenna elements"), an amplifier 30, a phase shifter 40, a distributor 50, and a control processor 70.

Additionally, a received power detector 60 (corresponding to a "receiving unit" according to the exemplary embodiment of the present invention) is arranged to detect a radiated power of radio waves outputted by the phased array antenna 1.

The oscillator 10 is a device that generates radio waves, and outputs a high-frequency (radio-frequency) signal oscillated by e.g., a Klystron, a travelling-wave tube, a magnetron, a Gunn diode as radio waves with stable frequency of several gigahertz (GHz) suitable for radar using an automatic frequency control circuit.

The plurality of antenna elements 20 is an aperture antenna such as a horn antenna, or a planer antenna such as a patch antenna, and, in the present embodiment, is arranged on a straight line at equally spaced intervals.

The amplifier 30 is a device that is connected to each antenna element 20, and amplifies power of radio waves outputted by the plurality of antenna elements.

The phase shifter 40 is a device that is connected to each antenna element 20, and changes a phase of radio waves outputted by the plurality of antenna elements 20 to form and steer beams of radio waves in the desired direction.

As the phase shifter 40, a switched-line type phase shifter using a PIN (p-intrinsic-n diode) diode, or a reflection-type phase shifter with a GaAs FET (gallium arsenide field-effect transistor), etc. is used.

The distributor 50 is a device that distributes radio waves generated by the oscillator 10 to the plurality of antenna elements 20 via the phase shifter 40. In the embodiment, the distributor 50 is a selection switch that receives an instruction signal from the control processor 70 and selects one or more of the plurality of antenna elements 20 for providing radio waves based on the instruction signal.

The received power detector 60 is a device that detects the power of radio waves radiated by the plurality of antenna elements 20 and outputs a detected received power to the control processor 70, and includes a receiving antenna 62, a receiver 64, and reflector 66.

The receiving antenna 62 is a device that receives radio waves reflected by the reflector 66 among radio waves outputted by the plurality of antenna elements 20.

The reflector 66 is a reflecting plate such as a corner reflector or a metallic plate that reflects radio waves outputted by the plurality of antenna elements 20, is located at the 0° direction with respect to a direction perpendicular to a radio waves radiation plane of the plurality of antenna elements 20.

The receiver 64 is a device that receives radio waves reflected by the reflector 66, detects the radio waves, and outputs it to the control processor 70.

The control processor 70 is a device that controls the phase shifter 40 and the distributor 50 and records power detected by the receiver 64 to identify positions of reflecting objects in a radar detection area that can be detected by the radar, and includes a CPU (central processing unit), ROM (read only memory), RAM (random access memory), and I/O (input/output) (not shown). The control processor 70 reads a program stored in the ROM and then executes the following calibration process.

Figure 2:
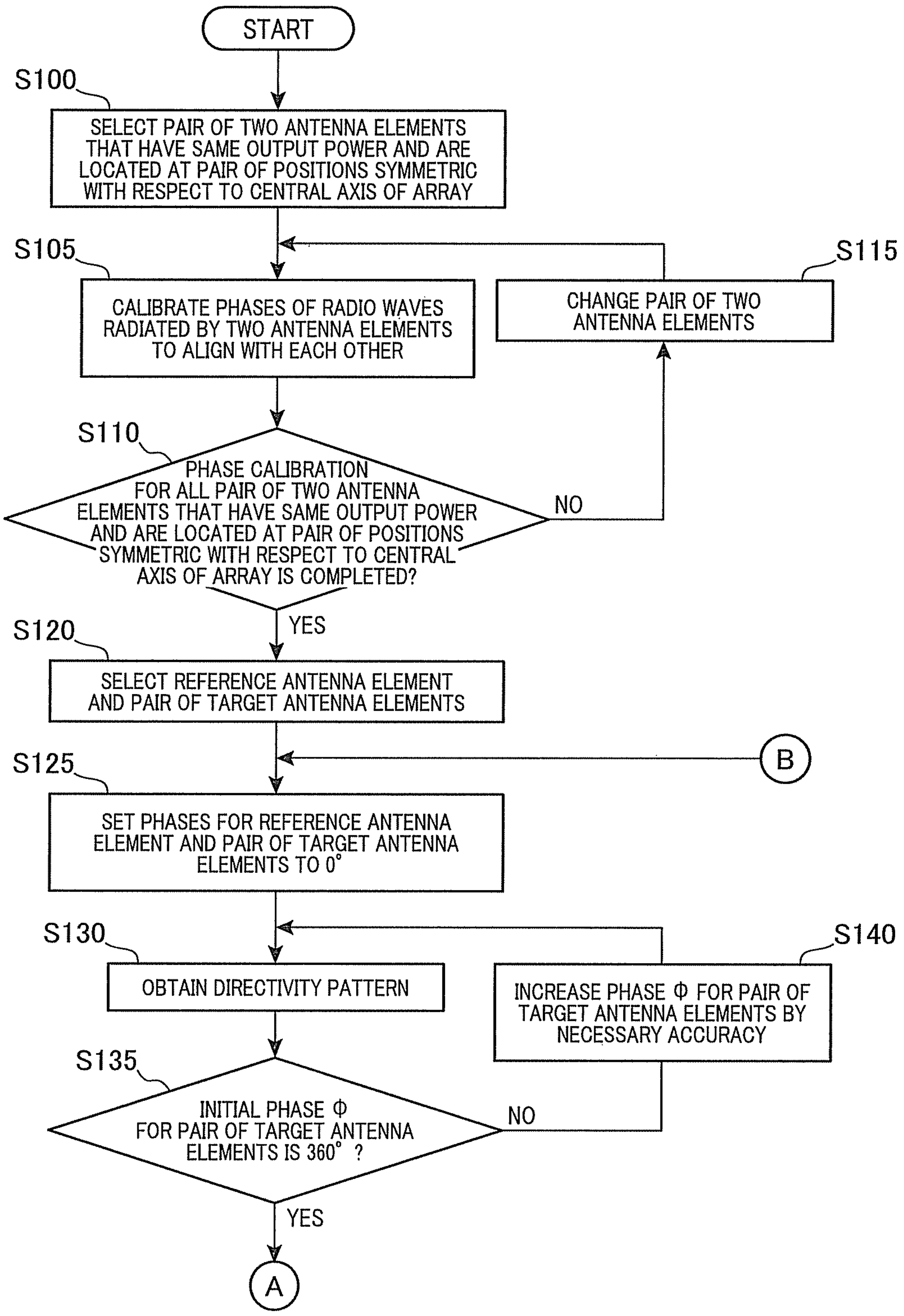
FIG. 2 is a schematic flowchart showing a flow of a calibration process according to the exemplary embodiment.
Figure 3:
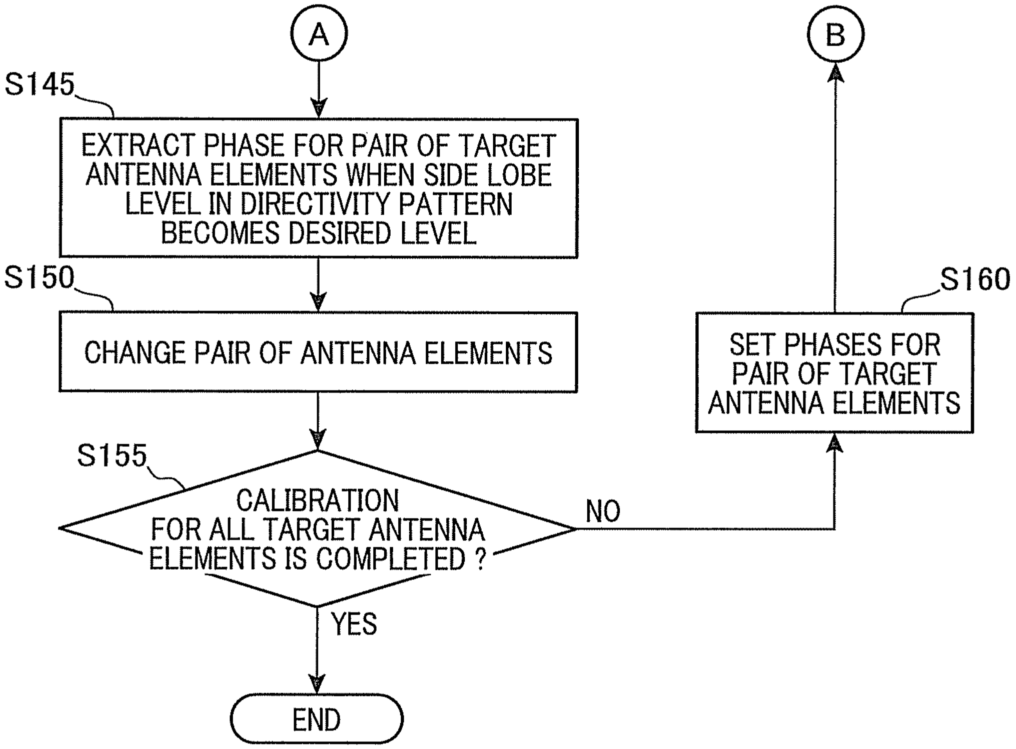
FIG. 3 is a schematic flowchart showing a flow of a calibration process following the flow shown in FIG. 2 according to the exemplary embodiment.

Next, referring to FIGS. 2 and 3, a calibration process executed by the CPU of the control processor 70 is described. FIGS. 2 and 3 are a flowchart showing a flow of the calibration process.

In the calibration process, first, at steps S100-S115, the CPU performs a first calibration process to calibrate a phase of phase shifters 42 and 43 connected to a pair of antenna elements 22 and 23 located at a pair of positions that are symmetric with respect to a central axis of an array in the phased array antenna 1. That is, at step S100, the CPU selects a pair of two antenna elements 22 and 23 symmetric with respect to the central axis of an array in the phased array antenna 1 from the plurality of antenna elements 20 and to provide radio waves with only the two antenna elements 22 and 23 selected. Powers outputted by the two antenna elements 22 and 23 are set to be equal to each other.

Subsequently, at step S105, the CPU controls the phase shifter 40 connected to each of the two antenna elements 22 and 23 so as to calibrate each phase of the two antenna elements 22 and 23 to become equal to each other.

At step S110, the CPU judges whether or not a phase calibration of all of the pair of two antenna elements 22 and 23 with the same output power is completed. As a result, if the CPU judges that the pair of two antenna elements 22 and 23, whose phase calibration is not completed yet, exists (No in step S110), the CPU proceeds to a process of step S115 to perform a process to select this pair of two antenna elements 22 and 23 and then returns to step S110 to perform the process to calibrate each phase of the two antenna elements 22 and 23.

In contrast, if the CPU judges that the calibration of all of the pairs of the two antenna elements 22 and 23 is completed (Yes in step S110), the CPU proceeds to a process of step S120.

When the process of step S110 is completed, the pair of antenna elements 22 and 23 with same output power is equal in phase to each other, but the pair of antenna elements with different output power, e.g., the antenna element 21 and the antenna elements 22, 23 are not calibrated in phase.

Due to this, at step S120 or later, the CPU performs a second calibration process to calibrate a phase of the phase shifters 41, 42 and 43 between the antenna element 21 with different output power (hereinafter referred to as "reference antenna element 21") and the pair of antenna elements 22, 23 except for the reference antenna element 21 (hereinafter referred to as "target antenna elements 22 and 23"). The reference antenna element 21 is a reference of a phase calibration, and is located at a position on a central axis of an array of the plurality of antenna elements 20. The target antenna elements 22 and 23 are a target of the phase calibration with respect to the reference antenna element 21, and are located at a pair of positions that are symmetric with respect to the central axis on the array.

At step S120, the CPU performs a process to provide radio waves for only the reference antenna element 21 and the target antenna elements 22 and 23 via the distributor 50.

In this case, the CPU sets the distributor 50 in such a manner that radio waves produced by the oscillator 10 are provided for only the reference antenna element 21 and the target antenna elements 22 and 23 and are not provided for the other antenna elements 20.

Here, the reference antenna element 21 corresponds to an antenna element 20 that is located at a center of an array of the plurality of antenna elements 20 arranged on an approximate straight line. The target antenna elements 22 and 23 correspond to a pair of antenna elements 20 that are located at positions symmetric with respect to a center line corresponding to a position of the reference antenna element 21.

Subsequently, at step S125, the CPU performs a process to set phases of the reference antenna element 21 and the target antenna elements 22 and 23 to 0°. Here, in the target antenna elements 22 and 23, phase calibration values between the antenna elements 22 and 23 calculated at step S105 are obtained, and then the phases thereof correspond with 0°.

At step S130, the CPU performs a process to obtain a directivity pattern aimed by the reference antenna element 21 and the target antenna elements 22 and 23 (i.e., total three antenna elements 21, 22 and 23).

That is, the CPU changes phases of phase shifters 42 and 43 connected to the target antenna elements 22 and 23, while fixing a phase of a phase shifter 41 connected to the reference antenna element 21.

Then, the CPU obtains the directivity pattern formed by the reference antenna element 21 and the target antenna elements 22 and 23 from a distribution of a received power, which is received at the received power detector 60, along a direction perpendicular to a radio wave radiation direction of the plurality of antenna elements 20.

Figure 4A:
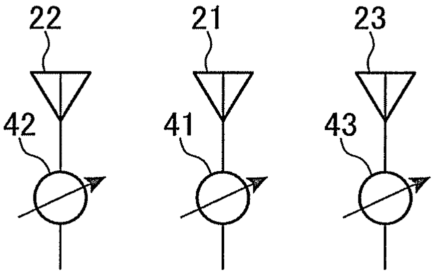
FIGS. 4A and 4B are diagrams showing an example of directivity patterns formed by three antenna elements of one reference antenna element and two target antenna element according to the exemplary embodiment.
Figure 4B:
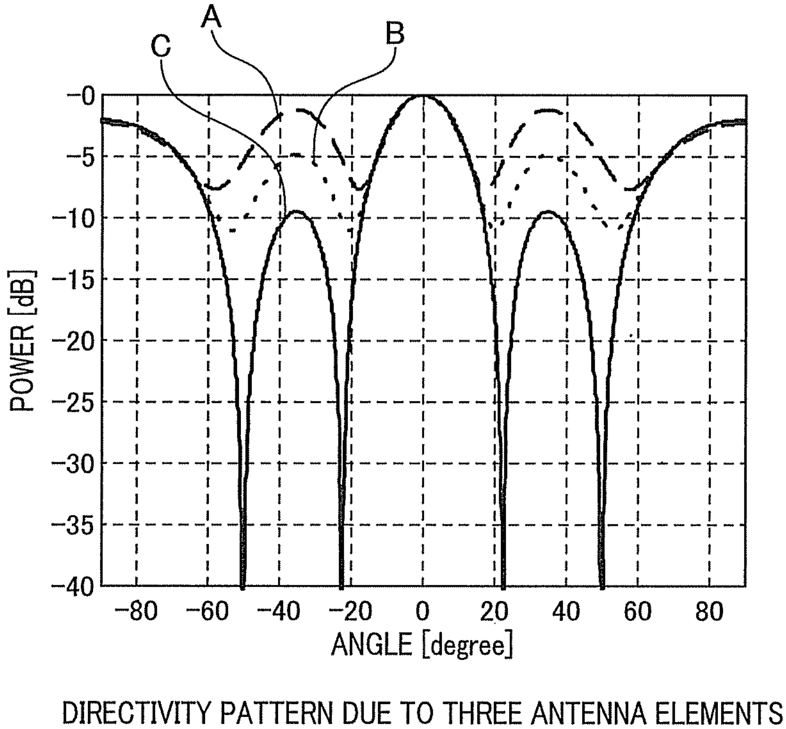

Here, referring to FIGS. 4A and 4B, a method of obtaining the directivity pattern is described. FIGS. 4A and 4B show an example of a directivity pattern formed by the reference antenna element 21 and the target antenna elements 22 and 23, when the phases of the target antenna elements 22 and 23 are changed.

As shown in FIG. 4A, among the three antenna elements 21, 22 and 23, the reference antenna element 21 is located at the center, and the target antenna elements 22 and 23 are located at the left and right sides of the reference antenna element 21.

FIG. 4B shows the received power pattern obtained under the condition that the phase of the reference antenna element 21 is set to 0°, and $\phi$ is calibrated so as to become 0, where $\phi$ is a phase difference between the target antenna element 22 located at the left side of the reference antenna element 21 and the target antenna element 23 located at the right side of the reference antenna element 21.

In order to obtain the received power pattern shown in FIG. 4B, $\theta_1$-$\theta_3$ expressed by the following Formulas 1-5 may be used to calibrate the reference antenna element 21 and the target antenna elements 22 and 23, i.e., the phase shifters 41, 42 and 43.

$$\theta_1=\phi-\theta_d \quad \text{(Formula 1)}$$

$$\theta_2=0 \quad \text{(Formula 2)}$$

$$\theta_3=\phi+\theta_d \quad \text{(Formula 3)}$$

$$\theta_d=k\cdot d\cdot \sin\theta \quad \text{(Formula 4)}$$

$$k=2\pi/\lambda \quad \text{(Formula 5)}$$

where d: antenna distance between antenna elements $\lambda$: wave length of radio wave $\theta$: maximum radiation direction of directivity Here, under the condition that, in Formula 4, $\theta$ is changed from −90° to 90°, the receiver 64 receives radio waves reflected by the reflector 66 located in front of the reference antenna element 21 and the target antenna elements 22 and 23.

In such steps, at steps S135 and S140, while a given phase difference ϕ of the target antenna elements 22, 23 with respect to the reference antenna element 21 is changed from 0° to 360°, a phase at which side lobes of a received power pattern obtained at step S130 becomes a desired value (predetermined value) is obtained. FIGS. 4A-4C show the cases where the phase difference ϕ of the target antenna elements 22, 23 (i.e., the phase shifter 42, 43) with respect to the reference antenna element 21 (i.e., the phase shifter 41) is 0°, 30°, and 60°.

Subsequently, at step S145, the CPU performs a process to extract, from the graph of the received power pattern obtained at steps S130-S140, the phase values of the phase shifter 42 and 43 at which the value of its side lobe becomes a desired value.

Figure 5:
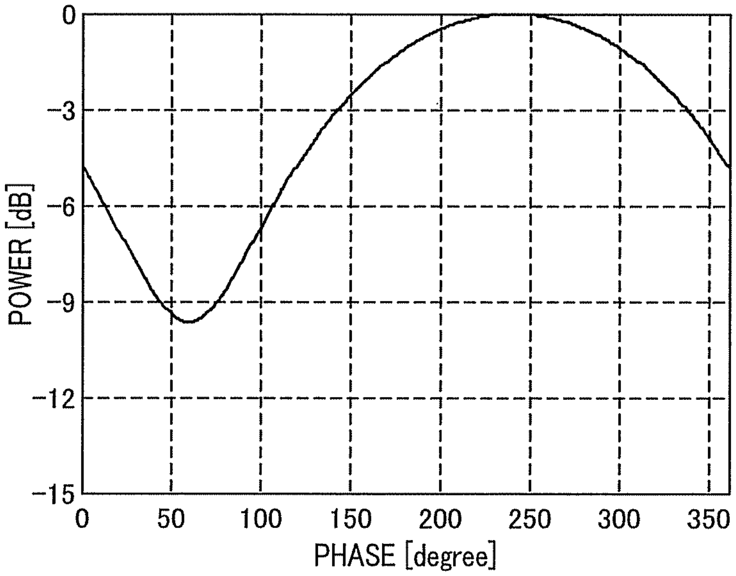
FIG. 5 is a graph showing an example of a change in a level of side lobe when a phase deference in directivity patterns formed three antenna elements of one reference antenna element and two target antenna element according to the exemplary embodiment.

FIG. 5 shows a graph plotting a relationship between a change in phase difference ϕ, between the reference antenna element 21 and the target antenna elements 22, 23, and a change in a level of side lobe that exists in 50° direction. In the present embodiment, ϕ=60° expressed by "C" in FIG. 4B, shows the lowest level of side lobes.

At step S150, the CPU performs a process to set the phases of the phase shifters 42 and 43 to the phase value ϕ=60° (phase shown in "C" of FIG. 4B and FIG. 5) extracted at step S145.

At step S155, the CPU performs a process to judge whether or not a phase calibration with respect to all of the target antenna elements 22 and 23 is completed. As a result, if the CPU judges that the phase calibration with respect to all of the target antenna elements 22 and 23 is completed (Yes in step S155), the CPU ends the process. In contrast, if the CPU judges that the phase calibration with respect to all of the target antenna elements 22 and 23 is not completed (No in step S155), the CPU proceeds to a process of step S160.

At step S160, the CPU performs a process to change the target antenna elements 22 and 23. That is, a calibration target is changed from the antenna elements 20 whose phase calibration is completed (the target antenna elements 22 and 23) to the other antenna elements 20 (new target antenna elements 22 and 23).

Subsequently, the CPU returns to the process of step S125, and repeats the processes of steps S125-S160 with respect to the new target antenna elements 22, 23 and the reference antenna element 21.

In the above phased array antenna 1, a directivity pattern, which is formed by three antenna elements 20, i.e., the reference antenna element 21 and the target antenna elements 22, 23 and is symmetric with respect to a central axis of the array at which the reference antenna element 21 is located, is obtained.

In this case, when phases of the phase shifters 42 and 43 connected to each of the pair of antenna elements 22 an 23 are changed in the same way, a magnitude of the side lobes of the directivity pattern is changed (see FIG. 4B).

Therefore, if the phases of the phase shifters 42 and 43 are set in such a manner that the level of side lobe becomes a predetermined value or less, the phase of the pair of antenna elements 22 and 23 can be calibrated.

If such steps that sets the phases of the phase shifters 42 and 43 are performed with respect to an antenna element 20 (reference antenna element 21) located at a center of the array and all of the pair of antenna elements 20 (the target antenna elements 22 and 23) located at positions that are symmetric with respect to a central axis of the array, a phase of all of antenna elements 20 can be calibrated, as a whole of the phased array antenna 1.

Hereinafter, referring to FIGS. 6A, 6B and 7A-7C, compared to the case where phases of two antenna elements 21 and 22 are changed, advantages in the case where phases of three antenna elements 21, 22 and 23 are changed are described.

Figure 6A:
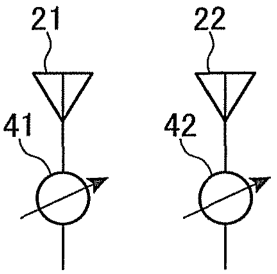
FIGS. 6A and 6B are diagrams showing an example of directivity patterns fowled by two antenna elements with a different power output according to the exemplary embodiment.
Figure 6B:
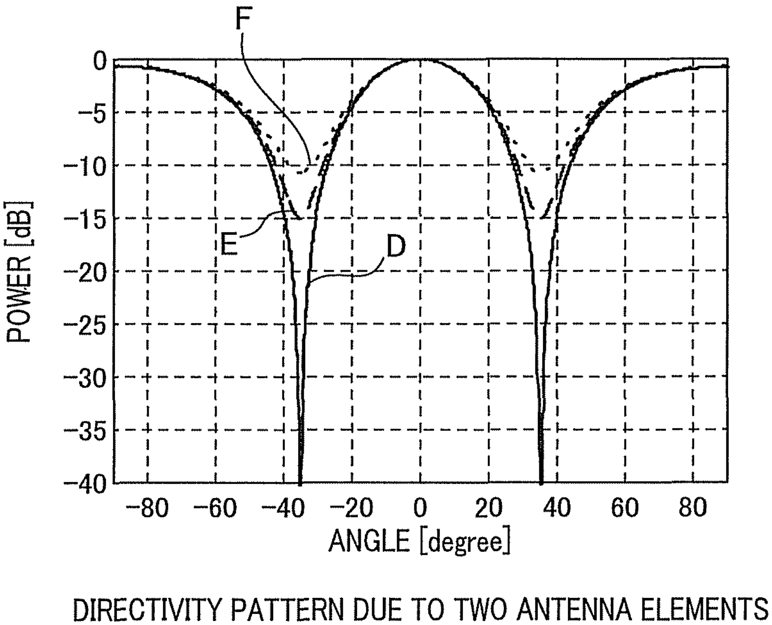
Figure 7A:
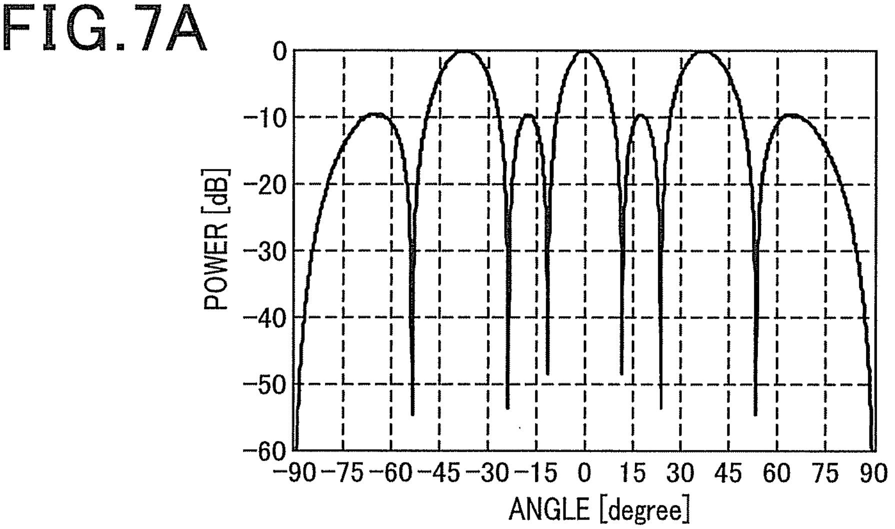
FIGS. 7A-7C are diagrams showing an example of directivity patterns formed by three antenna elements with a different power output according to the exemplary embodiment.
Figure 7B:
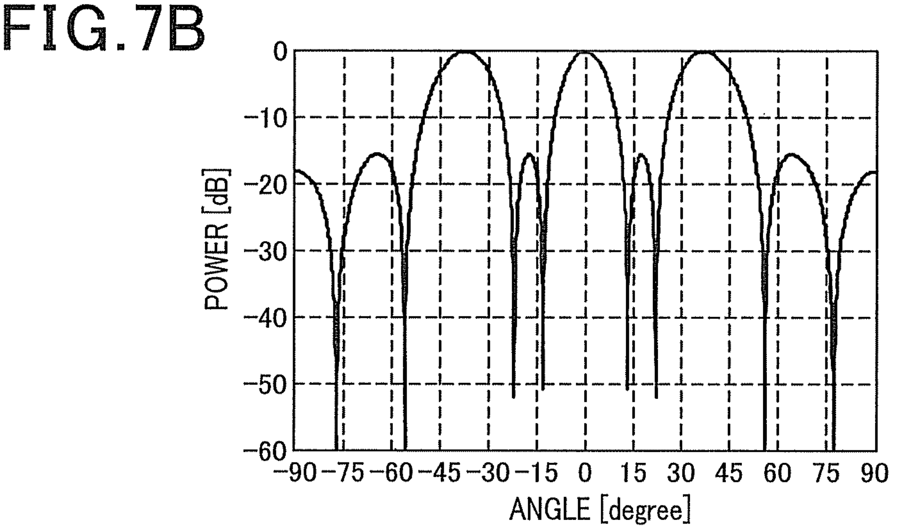
Figure 7C:
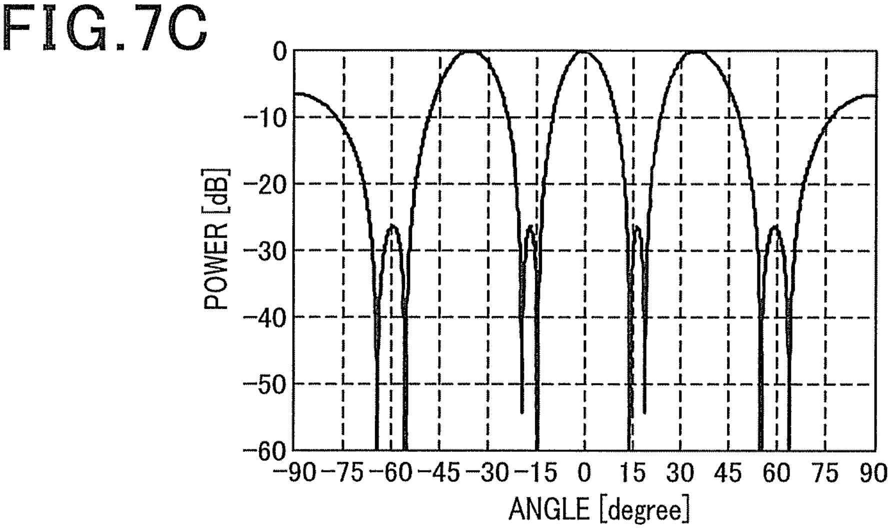

FIGS. 6A and 6B show a directivity pattern formed by two antenna elements 21 and 22 with different radio wave output. FIGS. 7A-7C show a directivity pattern formed by three antenna elements 21, 22 and 23 with different radio wave output.

In FIG. 6B, "D" shows a directivity pattern where outputs of two antenna elements 21 and 22 (see FIG. 6A) are the same, "E" shows a directivity pattern where one of outputs of two antenna elements 21 and 22 is 1 and the other of that is 0.7, and "F" shows a directivity pattern where one of outputs of two antenna elements 21 and 22 is 1 and the other of that is 0.55.

As shown in FIG. 6B, in the case where output of radio waves radiated by each of antenna elements 21 and 22 is equal to each other, a null point that occurs in the directivity pattern becomes deep. However, in the case where output of radio wave radiated by each of antenna elements 21 and 22 is different from each other, as an output difference between both of outputs of two antenna elements 21 and 22 becomes large, a null point that occurs in the directivity pattern becomes shallow.

In contrast, FIG. 7A shows a directivity pattern where outputs of three antenna elements 21, 22 and 23 (see FIG. 4A) are the same, FIG. 7B shows a directivity pattern where output of antenna elements 21 located at the center of the array is 1 and outputs of the other two antenna elements 22 and 23 are 0.7, and FIG. 7C shows a directivity pattern where output of antenna elements 21 located at the center of the array is 1 and outputs of the other two antenna elements 22 and 23 are 0.55.

As shown in FIGS. 7A-7C, in a directivity pattern formed by three antenna elements 21, 22 and 23, as a phase difference between the antenna elements 21 and the other two antenna elements 22, 23 is changed, a level of side lobe is significantly changed.

Therefore, the use of three antenna elements 21, 22 and 23 can detect a change in side lobe and then can perform a calibration more precisely.

Further, in the present embodiment, the reflector 66 reflects radio waves outputted by the plurality of antenna elements 20, and the receiver 64 receives the radio waves reflected at the reflector 66. This makes it possible to obtain a directivity pattern of antenna elements 20.

In addition, a plurality of components except for the reflector 66 can be incorporated into, e.g., one component to configure the phased array antenna 1 with compact configuration.

Other Embodiments

The present invention is described with reference to the above exemplary embodiment thereof, but the present invention is not limited to the embodiment. Various changes in form and details may be made, for example, as below.

Figure 8:
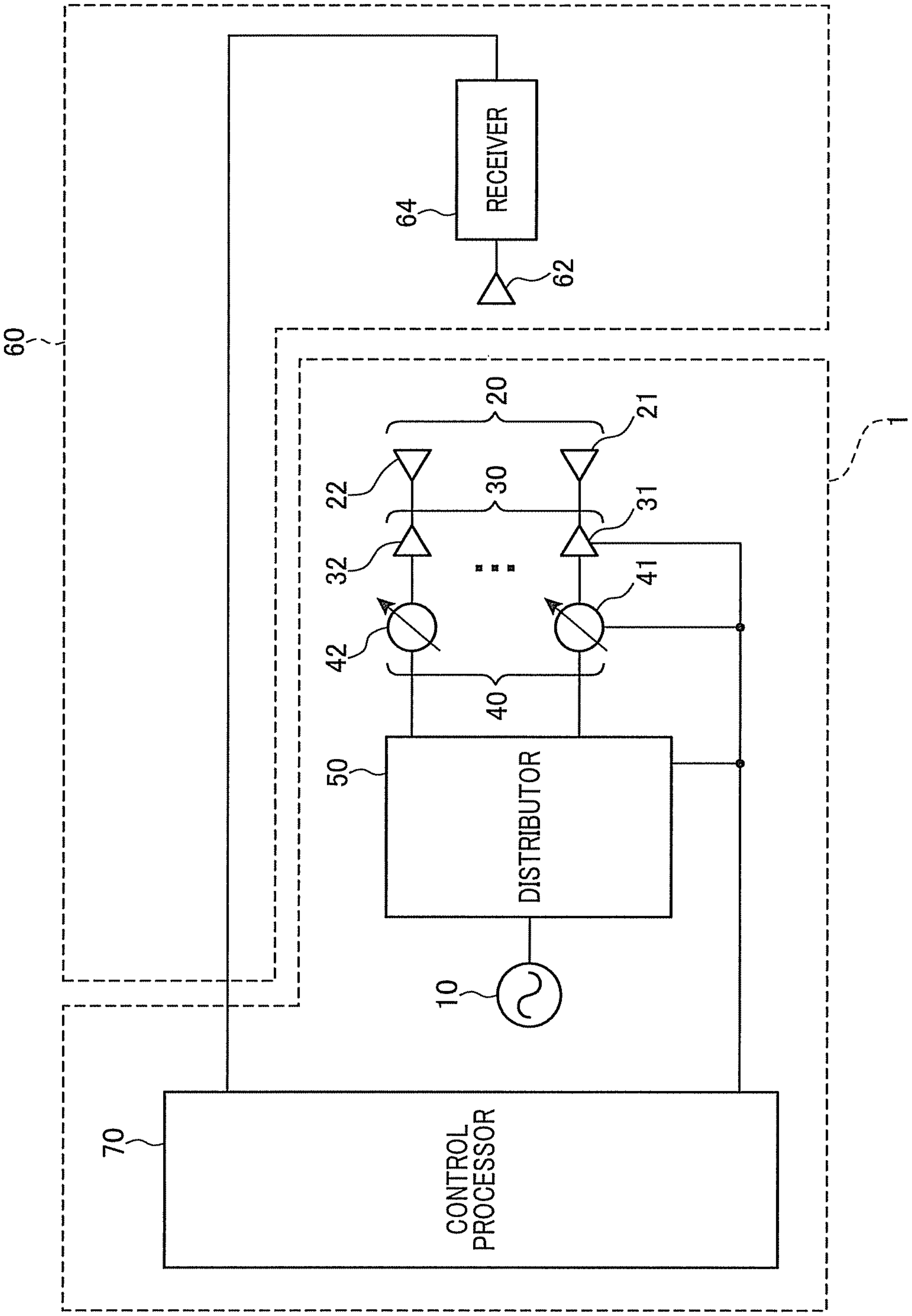
FIG. 8 is a schematic block diagram showing a configuration of a phased array antenna that obtains a directivity pattern at a receiver located in front of a radio wave radiation plane of a plurality of antenna elements according to the other exemplary embodiment.

(1) In the above embodiment, when a received power variation pattern is obtained, the receiver 64 may receive radio waves reflected by the reflector 66. Alternatively, as shown in FIG. 8, without the reflector 66, the receiver 64 may be located in front of a radio wave radiation plane so as to obtain the received power variation pattern at the receiver 64.

(2) In the above embodiment, the plurality of antenna elements 20 forming the phased array antenna 1 is arranged on an approximately straight line. Alternatively, the plurality of antenna elements 20 may be arranged on a two-dimensional plane in a matrix pattern.

In this case, among the plurality of antenna elements 20, one may be selected as the reference antenna element 21, a calibration may be performed every row and column with reference to a phase of the reference antenna element 21.

(3) In the above embodiment, when the directivity pattern is obtained, the phase θ of the target antenna elements 22 and 23 is changed from −90° to 90°, and the receiver 64 receives radio waves reflected at the reflector 66 located in front of the reference antenna element 21 and the target antenna elements 22 and 23. Alternatively, without changing the phase θ, the receiver 64 may be located in front of the reference antenna element 21 and the target antenna elements 22 and 23, and, while the receiver 64 is moved along a direction perpendicular to a radio wave radiation direction of the reference antenna element 21 and the target antenna elements 22 and 23, a received power can be measured through the receiver 64 to obtain the directivity pattern.

(4) In the above embodiment, the distributor 50 receives instruction signal from the control processor 70 and selects one or more of the plurality of antenna elements 20 for providing radio waves based on the instruction signal. Alternatively, the amplifier 30 may be used.

That is, the distributor 50 may include a distribution unit that has a function to only distribute radio waves generated by the oscillator 10 to all of the plurality of antenna elements 20, and a amplifier 30 connected to each antenna element 20. In this case, the distribution unit distributes the radio waves to all of the plurality of antenna elements 20. Here, if the gain of the amplifier 30, which is connected to the antenna elements except for the antenna elements 21, 22, and 23, is set to zero, the radio waves can be provided for only the antenna elements 21, 22, and 23 via the amplifier 30.

In this case, alternatively, a high-frequency switch may be used instead of the amplifier 30. Even in this configuration, the same effect can be obtained.

Figure 9A:
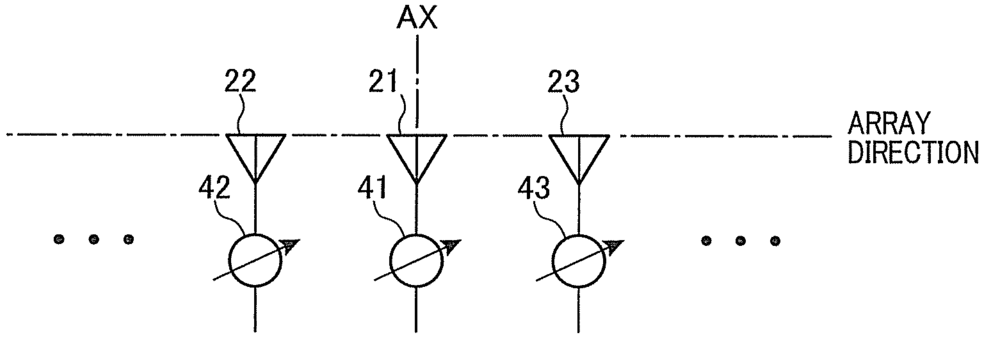
FIGS. 9A and 9B are diagrams showing a reference antenna element in the case where the number of arrayed antenna elements is odd and even respectively.
Figure 9B:
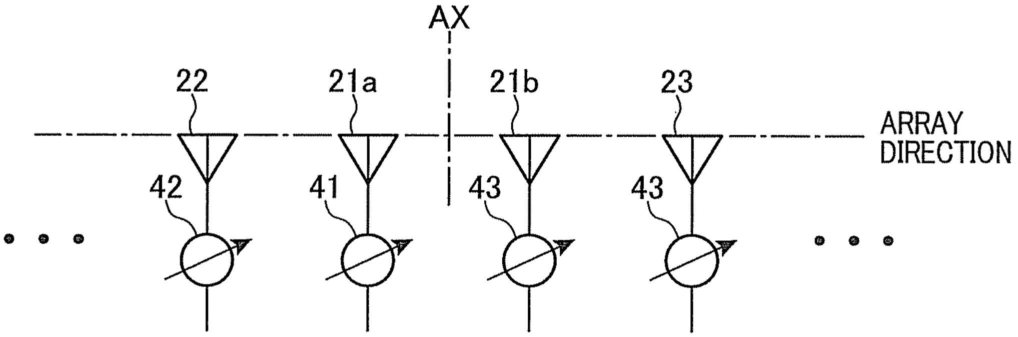

In the above embodiment, the number of arrayed antenna elements that form the array of the phased array antenna 1 is odd as shown in FIG. 9A. Alternatively, the number of arrayed antenna elements that form the array of the phased array antenna 1 may be even as shown in FIG. 9B. In this case, as shown in FIG. 9B, the reference antenna element may be a pair of antenna elements 21*a* and 21*a* a located at a pair of positions that are the nearest to a center axis AX of the array among a pair of positions symmetric with respect to the center axis AX of the array.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A phase calibration method for a phased array antenna, the phased array antenna comprising:

an oscillator that generates radio waves;

a plurality of antenna elements;

a plurality of phase shifters, each of which is connected to each of the plurality of antenna elements and changes a phase of radio waves radiated by the plurality of antenna elements;

means for distributing radio waves generated by the oscillator to the plurality of antenna elements via the plurality of phase shifters;

means for controlling the plurality of phase shifters and the distributing means; and a signal input part that inputs received signals outputted from a receiver that detects power of radio waves radiated by the plurality of antenna elements; and the phase calibration method comprising:

at the controlling means, calibrating a phase of each of the phase shifters for each pair of antenna elements located at a pair of positions symmetric with respect to a central axis of an array of the phased array antenna, among the plurality of antenna elements; and subsequently performing, with respect to an antenna element located at a position of the central axis of the array and all pairs of antenna elements located at positions symmetric with respect to the central axis of the array, the steps of:

supplying radio waves from the oscillator via the distributing means to an antenna element located at a position of the central axis of the array and a pair of antenna elements located at positions symmetric with respect to the central axis of the array, among the plurality of antenna elements;

obtaining a directivity pattern formed by the antenna element and the pair of antenna elements from a distribution in a received power of the radio waves, received at the receiver via the signal input part, along a horizontal direction with respect to an array direction of the plurality of antenna elements, while changing a phase of each of the phase shifters connected to the pair of antenna elements in the same manner; and setting a value of the phase of each of the phase shifters in such a manner that a level of side lobes, which occur in the directivity pattern obtained, becomes a predetermined value.

2. A phased array antenna, comprising:

an oscillator that generates radio waves;

a plurality of antenna elements;

a plurality of phase shifters, each of which is connected to each of the plurality of antenna elements and changes a phase of radio waves radiated by the plurality of antenna elements;

means for distributing radio waves generated by the oscillator to the plurality of antenna elements via the plurality of phase shifters;

means for supplying radio waves from the oscillator via the distributing means to, among the plurality of antenna elements, an antenna element located at a position of the central axis of the array and a pair of antenna elements located at positions symmetric with respect to the central axis of the array, when a phase of the plurality of antenna elements are calibrated;

a signal input part that inputs received signals outputted from a receiver that detects power of radio waves radiated by the plurality of antenna elements; and a calibrating unit configured to:

calibrate a phase of each of the phase shifters for each pair of antenna elements located at a pair of positions symmetric with respect to a central axis of an array of the phased array antenna, among the plurality of antenna elements; and subsequently perform, with respect to an antenna element located at a position of the central axis of the array and all pairs of antenna elements located at positions symmetric with respect to the central axis of the array, a process to:

supply, when a phase of the plurality of antenna elements are calibrated, radio waves from the oscillator via the distributing means to an antenna element located at a position of the central axis of the array and a pair of antenna elements located at positions symmetric with respect to the central axis of the array, among the plurality of antenna elements;

obtain a directivity pattern formed by the antenna element and the pair of antenna elements from a distribution in a received power of the radio waves, received at the receiver via the signal input part, along a horizontal direction with respect to an array direction of the plurality of antenna elements, while changing a phase of each of the phase shifters connected to the pair of antenna elements in the same manner; and set a value of the phase of each of the phase shifters in such a manner that a level of side lobes, which occur in the directivity pattern obtained, becomes a predetermined value.

* * * * *